United States Patent [19]

Galow et al.

[11] 4,210,430

[45] Jul. 1, 1980

[54] CYCLONE SEPARATOR ASSEMBLY

[75] Inventors: Manfred Galow, Essen; Nikolaus Stefancik, Düsseldorf, both of Fed. Rep. of Germany

[73] Assignee: Didier Engineering GmbH, Essen, Fed. Rep. of Germany

[21] Appl. No.: 965,710

[22] Filed: Nov. 30, 1978

[30] Foreign Application Priority Data

Dec. 12, 1977 [DE] Fed. Rep. of Germany ....... 2755257

[51] Int. Cl.$^2$ .......................... B01D 45/16; B01D 5/28
[52] U.S. Cl. .......................................................... 55/344
[58] Field of Search ............................... 55/344–346, 55/349, 418, 428, 459 R; 210/512 M; 209/144

[56] References Cited

U.S. PATENT DOCUMENTS

| 461,801 | 10/1891 | Radkey | 55/349 |
|---|---|---|---|
| 1,890,070 | 12/1932 | Whiton, Jr. | 55/344 |
| 2,717,054 | 9/1955 | Petersen | 55/344 |
| 3,543,931 | 12/1970 | Rastatter | 55/349 |

FOREIGN PATENT DOCUMENTS

| 1090940 | 10/1960 | Fed. Rep. of Germany | 55/345 |
|---|---|---|---|
| 22299 | of 1902 | United Kingdom | 55/344 |
| 481320 | 11/1975 | U.S.S.R. | 55/349 |

*Primary Examiner*—David L. Lacey
*Attorney, Agent, or Firm*—Wenderoth, Lind & Ponack

[57] ABSTRACT

A cyclone separator assembly includes a conveying pipe for conveying a carrier gas and solids conveyed thereby along a flow path extending in a rectilinear direction. A diagonal wall extends across the conveying pipe in a direction which is diagonally inclined with respect to the rectilinear direction. A plurality of cyclone separator units are located adjacent the diagonal wall. A plurality of branch pipes, one each for each cyclone separator unit, convey carrier gas and solids from the conveying pipe to the cyclone separator units. Each branch pipe has a first end connected to the diagonal wall and a second end connected to a respective cyclone separator unit. At least an initial length portion of each branch pipe, taken from the first end thereof, extends in a direction substantially parallel to the rectilinear direction of flow of the carrier gas and suspended solids within the conveying pipe.

10 Claims, 2 Drawing Figures

CYCLONE SEPARATOR ASSEMBLY

BACKGROUND OF THE INVENTION

The present invention is directed to a cyclone separator assembly for use in separating solids from a carrier gas conveying such solids.

More particularly, the present invention is directed to such a cyclone separator assembly for use in separating dried and also possibly preheated coal from a carrier gas, for example an inert gas or a flue gas.

It is known to convey dry comminuted solids by the socalled flue-flow principle wherein the solids are conveyed by a flow of carrier gas through a pipe system. This principle is particularly known in the modern coke manufacturing technology wherein coke to be supplied to coke ovens is conveyed by a hot carrier gas which dries the coal, and also possibly preheats the coal to approximately 200° C. Such drying and/or preheating is advantageous, in comparison with moist coal, and the dried and/or preheated coal has an improved bulk density which is more homogenous due to greater fluidity, results in an improved quality of coke, and allows a shorter coke production period, thereby increasing efficiency of the coke manufacturing plant.

One known arrangement for drying and also possibly preheating coal prior to the introduction thereof into a coke oven battery involves transporting the coal through a conveying pipe by means of a hot carrier gas, for example an inert gas or a flue gas, thereby drying and possibly preheating the coal. In such an arrangement, it is necessary to separate the dried and possibly preheated coal from the carrier gas before the introduction of the coal into the coke oven battery.

SUMMARY OF THE INVENTION

With the above discussion in mind, it is an object of the present invention to provide a cyclone separator assembly for use in separating solids from a carrier gas conveying such solids.

More particularly, it is an object of the present invention to provide such a cyclone separator assembly for use in separating coal, for example dried and/or preheated coal, from a carrier gas.

It is a yet further object of the present invention to provide such a cyclone separator assembly which allows a particularly effective separation of solids from a carrier gas, while providing a great economy of space.

These objects are achieved in accordance with the present invention by the provision of a cyclone separator assembly including a conveying pipe for conveying a carrier gas and solids conveyed thereby along a flow path extending in a rectilinear direction. A diagonal wall extends across the conveying pipe in a direction which is diagonally inclined with respect to the rectilinear direction. A plurality of cyclone separators or separator units are located closely adjacent the diagonal wall. Branch pipes transfer the carrier gas and solids from the conveying pipe to the cyclone separators, whereat the solids and carrier gas are separated. Each cyclone separator has associated therewith a separate branch pipe. Each branch pipe has a first end connected to the diagonal wall and opening into the conveying pipe and a second end connected to and opening into the respective cyclone separator. At least an initial length portion of each branch pipe, taken from the first end thereof, extends in a direction substantially parallel to the rectilinear direction of flow of the carrier gas and solids within the conveying pipe.

The arrangement of the diagonal wall extending in a direction diagonally inclined across the conveying pipe, i.e. diagonally across the rectilinear direction of flow of the carrier gas solids within the conveying pipe, produces a very effective, almost entirely uniform distribution of the total quantity of carrier gas and solids into the branch pipes. Additionally, the provision of the diagonal wall makes it possible to have the branch pipes extend substantially in the direction of flow within the conveying pipe, thereby largely avoiding the creation of eddy currents within the carrier gas before the introduction of the carrier gas into the cyclone separators. This in turn substantially avoids any reduction in the velocity of flow and therefore any premature separation of the solids from the carrier gas. Accordingly, each of the separate cyclone units operates to a maximum efficiency, and therefore the overall assembly operates efficiently. Further, the flow of solids is subjected to a guiding or a deflection only after the solids have already reached the cyclone separator units, or at least until the solids are positioned well within the respective branch pipes.

The cyclone separators are all substantially positioned adjacent the diagonal wall and are all substantially located within a free space formed by the projection of an extension of the conveying pipe.

In accordance with a specifically preferred embodiment of the present invention, the cyclone separators include a first group of cyclone separators arranged in a first row extending substantially parallel to the diagonal wall and positioned closely adjacent the diagonal wall. The branch pipes of the first group of cyclone separators extend throughout substantially the entire lengths thereof in directions substantially parallel to the rectilinear direction of flow within the conveying pipe. A second group of cyclone separators are arranged in a second row positioned behind and closely adjacent the first row. Each of the branch pipes of the second group of cyclone separators extend between an adjacent pair of the first group of cyclone separators. Each branch pipe of the second group of cyclone separators includes an initial length portion extending in a direction substantially parallel to the rectilinear direction of flow within the conveying pipe, as well as a curved following section connected to the respective cyclone separator and having a curvature such that no portion of such following section extends at an angle less than an obtuse angle with respect to the rectilinear direction of flow within the conveying pipe.

The second ends of the branch pipes are preferably connected tangentially to the respective cyclone separators. The first ends of the branch pipes collectively form substantially the entire area of the diagonal wall, i.e. the total area of the first ends of the branch pipes collectively equal substantially the entire area of the diagonal wall. That is, the first ends of the branch pipes are positioned so closely adjacent one another that virtually no portion of the area of the diagonal wall forms a baffle or partition confronting the flow of carrier gas and solids, thereby subtantially avoiding a slowing of the flow, and any resultant premature separation of the solids from the carrier gas.

A carrier gas removal pipe is connected to top portions of the cyclone separators by means of pipe connections, to thereby remove the carrier gas after separation thereof from the solids. Also, collecting containers are connected to lower portions of the cyclone separators for removing the solids after separation thereof from the carrier gas. In a specific embodiment of the present invention, the collecting containers are each connected to a pair of the cyclone separators.

The uniquely compact arrangement of the cyclone separator assembly of the present invention makes it possible to construct an integral structural unit which can be readily connected to and disconnected from a given pipeline and which thereby can be used for separating different conveyed solids. The assembly of the present invention further involves an optimal utilization of space, whereby a plurality of groups of cyclones can be employed within the smallest possible space.

BRIEF DESCRIPTION OF THE DRAWINGS

Other objects, features and advantages of the present invention will be apparent from the following detailed description of an exemplary preferred embodiment thereof, with reference to the accompanying drawings, wherein.

DETAILED DESCRIPTION OF THE INVENTION

Figure 1:
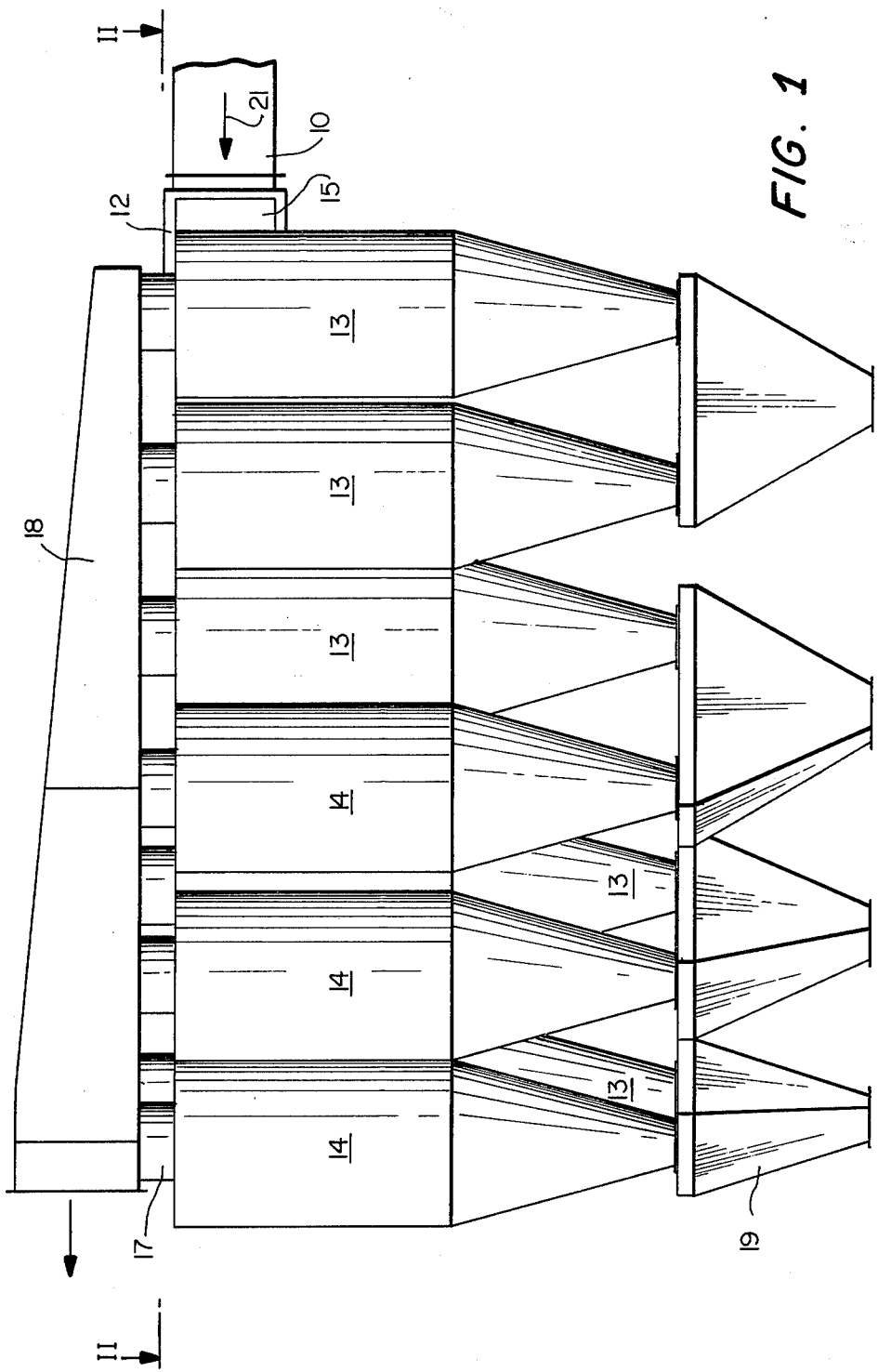
FIG. 1 is a schematic elevation view of a cyclone separator assembly according to the present invention connected to a pipeline.

The preferred embodiment of the present invention illustrated in the drawings is particularly suitable for the separation of dried and/or preheated coal from a conveying carrier gas. However, it is to be understood that the present invention is intended to be usable for the separation of other solids from other respective carrier gases.

The cyclone separator assembly of the present invention includes a conveying pipe section or housing 12 connected by means of flange coupling 11 to a conveying pipeline 10 which directs a flow of carrier gas and dried and/or preheated coal along a flow path extending in a rectilinear direction, as indicated by arrow 21. It will be understood that conveying pipeline 10 is charged with coal from a coal bin and is coupled to a compressor (not shown) by means of which the coking coal is conveyed and simultaneously dried and/or preheated, in a manner which does not form a portion of the present invention and which is otherwise known.

A diagonal wall 20 closes off and extends across conveying pipe section 12 in a direction which is diagonally inclined with respect to rectilinear direction 21. A plurality of cyclone separators 13 and 14, to be discussed in more detail below, are located adjacent diagonal wall 20. Cyclone separators 13 and 14 are respectively connected to pipe section 12 by means of branch pipes 15 and 16, to be discussed in more detail below. The carrier gas and the coal carried thereby pass from pipe section 12 through branch pipes 15 and 16 into respective cyclone separators 13 and 14, whereat the carrier gas is separated from the coal. Preferably, the branch pipes 15 and 16 extend tangentially into respective cyclone separators 13 and 14. Carrier gas removal pipe 18 is connected to the heads or upper portions of cyclone separators 13 and 14 by means of pipe connections 17. Thus, carrier gas removal pipe 18 removes carrier gas freed from the coal after the separation operations within the cyclone separators, and such removed carrier gas may thereafter be reheated or remixed with hot flue gas or coke oven gas and be again used for conveying coal. Collecting containers 19 are connected to the lower portions of cyclone separators 13 and 14 to remove the separated coal therefrom for transport to a desired location, for example to a coke oven battery. Preferably, each collecting container 19 may be connected to an adjacent pair of cyclone separators as illustrated in the drawings.

In the illustrated arrangement, the cyclone separators are arranged into a first group of cyclone separators 13 arranged in a first row which extends in a direction substantially parallel to diagonal wall 20, and a second group of cyclone separators 14 arranged in a second row positioned behind and closely adjacent the first row. It is to be understood that the scope of the present invention is not intended to be limited to this specific arrangement, since the cyclone separators could be arranged in only a single row or more than two rows, as long as the other important structural features of the present invention, to be discussed in more detail below, are achieved. Additionally, in the illustrated embodiment, the first row includes five cyclone separators, and the second row includes three cyclone separators arranged approximately adjacent the three last cyclone separators of the first row. Again, it is to be understood that the scope of the present invention is not intended to be limited to this specific structural arrangement, but that rather other structural arrangements may be employed, as long as the important features of the present invention, to be discussed in more detail below, are achieved.

Each of the branch pipes 15 associated with the first group of cyclone separators 13 extend throughout substantially the entire lengths thereof in directions which are substantially parallel to the rectilinear direction 21 of flow within the conveying pipe. In other words, the carrier gas and suspended coal pass from conveying pipe section 12 into respective cyclone separators 13 in directions which are substantially parallel to rectilinear direction 21. This is precisely true in the case of the three downstream-most branch pipes 15 and is substantially the case in the two upstream-most branch pipes 15. At any rate, there will be substantially no deflection, or at most only a very slight deflection, of the flow of carrier gas and suspended coal between the conveying pipe section 12 and the respective cyclone separators 13.

Figure 2:
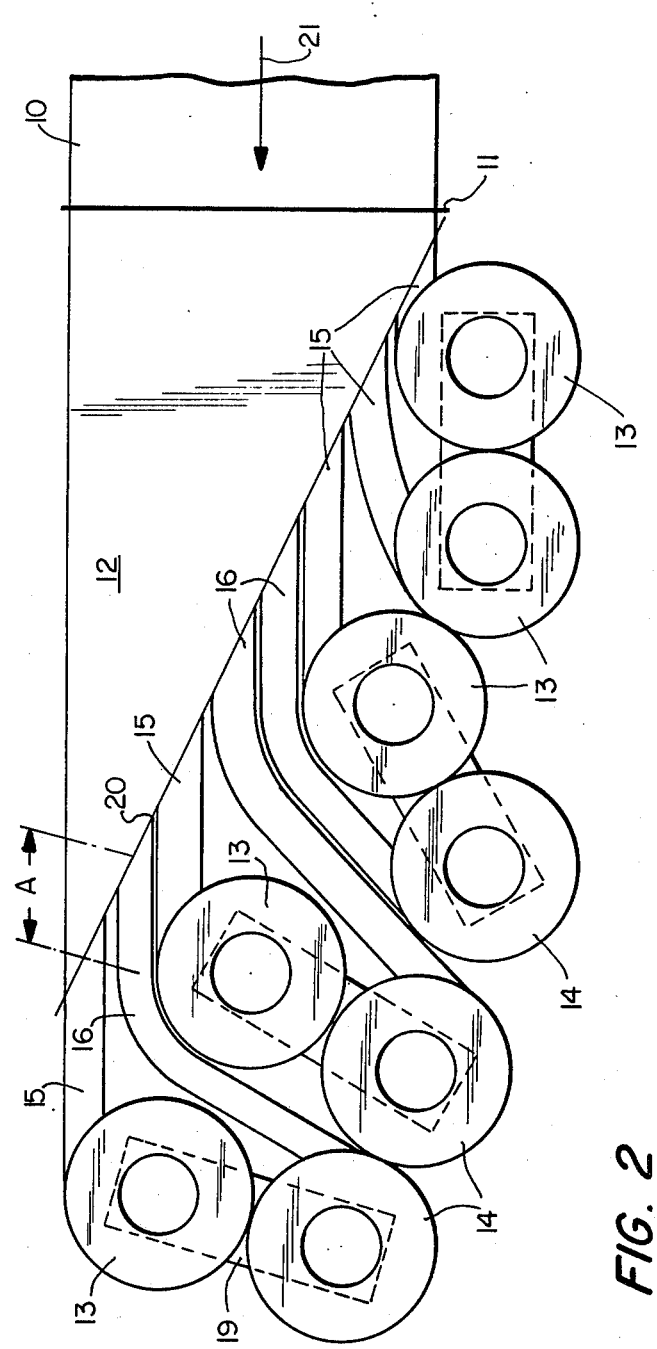
FIG. 2 is a schematic cross-section taken along line II—II of FIG. 1.

In a similar manner, the branch pipes 16 associated with the second group of cyclone separators 14 each include an initial or first length portion which extends in directions substantially parallel to the rectilinear direction 21 of flow within the conveying pipe. That is, and as illustrated in FIG. 2 of the drawings with respect to the downstream-most of the cyclone separators 14, the respective branch pipe 16 thereof has an initial length portion A which extends parallel to the rectilinear direction 21. Each branch pipe 16 further includes a curved following section which is connected to the respective cyclone separator 14 and which has a curvature such that no portion of the following section extends at an angle which is less than an obtuse angle with respect to rectilinear direction 21. In other words, the design of each branch pipe 16 includes an initial straight portion parallel to rectilinear direction 21 and a following curved section, the curvature of which is as slight as possible, and which at any rate is at no less than an obtuse angle with respect to rectilinear direction 21. Therefore, even in the longer branch pipes 16, the flow of carrier gas and suspended coal will not be subjected to any sharp or immediate direction changes, thereby avoiding premature separation.

Additionally, as will be apparent from FIG. 2 of the drawings, substantially all of the cyclone separators 13 and 14, and at least substantially all of branch pipes 15 and 16, are located within a free space which would be formed by the projection of an extension of conveying pipe section 12.

Branch pipes 15 and 16 are connected to diagonal wall 20 so closely together that they collectively form or take up substantially the entire cross-section or area of diagonal wall 20. Additionally, the branch pipes 15 and 16 are located so closely together at diagonal wall 20 that the area of any partitions between branch pipes 15 and 16 is insignificant with respect to the area of diagonal wall 20. This substantially avoids the provision of any partitions confronting the flow of carrier gas and suspended coal within conveying pipe section 12 which would form an obstruction to flow and which would thereby cause eddy currents and lead to premature separation. Additionally, any necessary partitions formed by adjacent walls of adjacent branch pipes substantially extend parallel to rectilinear directions 21, thereby providing a substantially deflection-free entry of the flow of carrier gas and suspended coal into the branch pipes 15 and 16.

By the above structural arrangement, it is possible to form branch pipes 15 and 16 to have relatively great widths and relatively short lengths, to thereby provide a uniform transfer of flow from pipe section 12 into all of the respective cyclone separators 13 and 14, without premature separation.

Furthermore, the entire arrangement of cyclone separators 13 and 14, branch pipes 15 and 16, diagonal wall 20 and conveying pipe section 12 may be formed as a single integral unit which can be readily connected to and disconnected from given and different conveying pipes 10.

Although the present invention has been described and illustrated herein with respect to a preferred embodiment, it will be apparent that various changes may be made to the specifically described and illustrated structural features without departing from the scope of the present invention.

What we claim is:

1. A cyclone separator assembly for use in separating solids such as coal from a carrier gas conveying such solids, said assembly comprising:
   conveying pipe means for conveying a carrier gas and solids conveyed thereby along a flow path extending in a rectilinear direction;
   a diagonal wall extending across said conveying pipe means in a direction which is diagonally inclined with respect to said rectilinear direction;
   a plurality of cyclone separators located adjacent said diagonal wall; and
   branching pipe means for transferring said carrier gas and solids from said conveying pipe means to said cyclone separators, whereat said solids and carrier gas are separated, said branching pipe means comprising a plurality of branch pipes, one said branch pipe for each said cyclone separator, each said branch pipe having a first end connected to said diagonal wall and opening into said conveying pipe means and a second end connected to and opening into a respective said cyclone separator, at least an initial length portion of each said branch pipe, taken from said first end thereof, extending in a direction substantially parallel to said rectilinear direction, such that said solids and carrier gas, upon passing said diagonal wall into said branch pipes, continue to flow substantially in said rectilinear direction within said initial length portions of said branch pipes, thereby preventing premature separation of said solids within said branch pipes.

2. An assembly as claimed in claim 1, wherein said plurality of cyclone separators are all substantially positioned adjacent said diagonal wall in a free space substantially formed by the projection of an extension of said conveying pipe means.

3. An assembly as claimed in claim 1, wherein said plurality of cyclone separators includes a first group of cyclone separators arranged in a first row extending substantially parallel to said diagonal wall and positioned closely adjacent said diagonal wall, said branch pipes of said first group of cyclone separators extending throughout substantially the entire lengths thereof in directions substantially parallel to said rectilinear direction.

4. An assembly as claimed in claim 3, wherein said plurality of cyclone separators further includes a second group of cyclone separators arranged in a second row positioned behind and closely adjacent said first row, each said branch pipe of said second group of cyclone separators extending between an adjacent pair of said first group of cyclone separators, each said branch pipe of said second group of cyclone separators including a respective said initial length portion extending in said direction substantially parallel to said rectilinear direction and a curved following section connected to the respective said cyclone separator and having a curvature such that no portion of said following section extends at an angle less than an obtuse angle with respect to said rectilinear direction.

5. An assembly as claimed in claim 1, wherein said cyclone separators, said branch pipes, said diagonal wall and at least a portion of said conveying pipe means are formed as a single integral unit which can readily be connected to and disconnected from a pipeline.

6. An assembly as claimed in claim 1, wherein said second ends of said branch pipes are connected tangentially to the respective said cyclone separators.

7. An assembly as claimed in claim 1, wherein said first ends of said branch pipes collectively take up substantially the entire area of said diagonal wall.

8. An assembly as claimed in claim 1, further comprising a carrier gas removal pipe means, connected to top portions of said cyclone separators by means of pipe connections, for removing said carrier gas after separation thereof from said solids.

9. An assembly as claimed in claim 1, further comprising collecting means, connected to lower portions of said cyclone separators, for removing said solids after separation thereof from said carrier gas.

10. An assembly as claimed in claim 9, wherein said collecting means comprise plural collecting containers, each said collecting container being connected to a pair of said cyclone separators.

* * * * *